United States Patent
Lee et al.

(10) Patent No.: US 10,497,994 B2
(45) Date of Patent: Dec. 3, 2019

(54) BATTERY PACK AND VEHICLE INCLUDING SUCH BATTERY PACK

(71) Applicant: LG CHEM, LTD., Seoul (KR)

(72) Inventors: Jong-Young Lee, Daejeon (KR);
Eun-Gyu Shin, Daejeon (KR);
Jung-Hoon Lee, Daejeon (KR);
Mi-Geum Choi, Daejeon (KR);
Jeong-O Mun, Daejeon (KR);
Yoon-Koo Lee, Daejeon (KR);
Hang-June Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 70 days.

(21) Appl. No.: 15/574,227

(22) PCT Filed: Jul. 26, 2016

(86) PCT No.: PCT/KR2016/008171
§ 371 (c)(1),
(2) Date: Nov. 15, 2017

(87) PCT Pub. No.: WO2017/078249
PCT Pub. Date: May 11, 2017

(65) Prior Publication Data
US 2018/0138561 A1 May 17, 2018

(30) Foreign Application Priority Data
Nov. 2, 2015 (KR) .................. 10-2015-0153324

(51) Int. Cl.
*H01M 10/613* (2014.01)
*H01M 10/6556* (2014.01)
(Continued)

(52) U.S. Cl.
CPC ....... *H01M 10/613* (2015.04); *H01M 2/1016* (2013.01); *H01M 10/6556* (2015.04); *H01M 10/6567* (2015.04)

(58) Field of Classification Search
CPC .......... H01M 10/613; H01M 10/6556; H01M 10/6567; H01M 2/10; H01M 2/1016
See application file for complete search history.

(56) References Cited

U.S. PATENT DOCUMENTS

2012/0231316 A1 9/2012 Sohn
2013/0323551 A1 12/2013 Lee et al.
(Continued)

FOREIGN PATENT DOCUMENTS

KR 10-2012-0102344 A 9/2012
KR 10-2012-0120663 A 11/2012
(Continued)

OTHER PUBLICATIONS

International Search Report (PCT/ISA/210) issued in PCT/KR2016/008171, dated Oct. 21, 2016.

*Primary Examiner* — Jimmy Vo
(74) *Attorney, Agent, or Firm* — Birch, Stewart, Kolasch & Birch, LLP (57) ABSTRACT

A battery pack, which includes a pack case forming an appearance of the battery pack, at least one battery module provided in the pack case and having at least one battery cell therein, and a coolant circulator connected to the at least one battery module to circulate a coolant into the at least one battery module, at least a portion of the coolant circulator pressing the at least one battery module in the pack case, is provided.

15 Claims, 8 Drawing Sheets

(51) Int. Cl.
*H01M 10/6567* (2014.01)
*H01M 2/10* (2006.01)

(56) References Cited

U.S. PATENT DOCUMENTS

| | | | |
|---|---|---|---|
| 2015/0171485 A1* | 6/2015 | Rawlinson | H01M 10/482 429/62 |
| 2016/0003553 A1 | 1/2016 | Campbell | |
| 2016/0087319 A1 | 3/2016 | Roh et al. | |

FOREIGN PATENT DOCUMENTS

| | | |
|---|---|---|
| KR | 10-2013-0008142 A | 1/2013 |
| KR | 10-2013-0081802 A | 7/2013 |
| KR | 10-2014-0143854 A | 12/2014 |
| KR | 10-2014-0147978 A | 12/2014 |
| WO | WO 2013/037742 A1 | 3/2013 |
| WO | WO 2013/105756 A1 | 7/2013 |
| WO | WO 2014/132047 A2 | 9/2014 |

* cited by examiner

BATTERY PACK AND VEHICLE INCLUDING SUCH BATTERY PACK

TECHNICAL FIELD

The present disclosure relates to a battery pack and a vehicle including the battery pack.

The present application claims priority to Korean Patent Application No. 10-2015-0153324 filed on Nov. 2, 2015 in the Republic of Korea, the disclosures of which are incorporated herein by reference.

BACKGROUND ART

A secondary battery, which is easily applied to various product groups and has electrical characteristics such as high energy density, is universally applied not only for a portable device but also for an electric vehicle (EV) or a hybrid electric vehicles (HEV), an energy storage system or the like, which is driven by an electric driving source. The secondary battery is attracting attention as a new environment-friendly energy source for improving energy efficiency since it gives a primary advantage of reducing the use of fossil fuels and also does not generate by-products by the use of energy at all.

Secondary batteries widely used at the preset include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.2V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module composed of a plurality of battery cells first, and then configure a battery pack by using a plurality of battery modules and adding other components.

A battery pack of a multi-battery module structure is manufactured so that a plurality of secondary batteries are densely packed in a narrow space, and thus it is important to easily discharge the heat generated from each secondary battery. The secondary battery is charged or discharged by means of electrochemical reactions as described above. Thus, if the heat of the battery module generated during the charging and discharging process is not effectively removed, heat accumulation occurs, which may promote the deterioration of the battery module and in occasions may cause ignition or explosion.

Therefore, a high-output large-capacity battery pack requires a cooling device that cools battery cells included therein.

Generally, the cooling device is classified into two types of cooling device, namely an air cooling type and a water cooling type, but the air cooling type is more widely used than the water cooling type due to short circuit or waterproofing of the secondary battery.

Since one battery cell may not produce a large power, a commercially available battery module generally includes a plurality of battery cells as many as necessary so as to be stacked and packaged in a module case, and a battery pack includes a plurality of battery modules as many as necessary so as to be stacked and packaged therein. In addition, in order to keep the temperature of the secondary battery at a proper level by cooling the heat generated while each battery cell is producing electricity, a plurality of cooling pins corresponding to the area of the battery cells are inserted as a heat dissipating member throughout the battery cells. The cooling pins absorbing heat from each battery cell are connected through a cooling plate to a heat sink provided at a bottom of the battery pack and transfer the heat thereto. The heat sink is cooled by cooling water or cooling air.

In addition, in a conventional battery pack, due to the plurality of cooling pins, the cooling plate and the heat sink interposed between the battery cells, the energy density of the battery cells is lowered as much as these components, and the manufacture cost is increased due to these components.

DISCLOSURE

Technical Problem

The present disclosure is directed to providing a battery pack which may ensure improved cooling performance while enhancing an energy density of battery cells with a reduced manufacture cost, and a vehicle including the battery pack.

Technical Solution

In one aspect of the present disclosure, there is provided a battery pack, comprising: a pack case forming an appearance of the battery pack; at least one battery module provided in the pack case and having at least one battery cell therein; and a coolant circulating unit connected to the at least one battery module to circulate a coolant into the at least one battery module, at least a portion of the coolant circulating unit pressing the at least one battery module in the pack case.

The pack case may include: a case body configured to accommodate the at least one battery module and the at least a portion of the coolant circulating unit; and a module pressing plate mounted to the case body and disposed opposite to at least a portion of the coolant circulating unit with the at least one battery module being interposed therebetween to press the at least one battery module.

The coolant circulating unit may include: a circulating unit body configured to store the coolant and having a circulation pump for circulating the coolant; and a circulation pipe configured to connect the circulating unit body and the at least one battery module to circulate the coolant into the at least one battery module, the circulation pipe being disposed in the case body to press the at least one battery module.

The battery module may be provided in plural, and the plurality of battery modules may be disposed sequentially between the circulation pipe and the module pressing plate and connected to each other so that the coolant circulates therein.

The circulation pipe may be connected to a facing battery module and press the plurality of battery modules toward the module pressing plate, and the module pressing plate may be connected to a facing battery module and press the plurality of battery modules toward the circulation pipe.

Each of the battery modules may include: a module case configured to accommodate the at least one battery cell; and a plurality of coolant pipes provided at the module case to introduce the coolant into the module case and discharge the coolant in the module case to the outside of the module case.

The plurality of coolant pipes may include: one pair of first coolant pipes provided at one side of the module case and disposed to be spaced from each other by a predetermined distance; and one pair of second coolant pipes provided at the other side of the module case and disposed to be spaced from each other by a predetermined distance.

The circulation pipe may be connected to one pair of first coolant pipes of a facing battery module.

The circulation pipe may include: a connection tube connected to the circulating unit body and disposed in the case body; a coolant supply tube configured to protrude from the connection tube and connected to any one of the pair of first coolant pipes; and a coolant discharge tube configured to protrude from the connection tube and connected to the other one of the pair of first coolant pipes.

The connection tube may be disposed parallel to the module pressing plate.

The coolant supply tube and the coolant discharge tube may be inserted into the pair of first coolant pipes, or the pair of first coolant pipes may be inserted into the coolant supply tube and the coolant discharge tube.

A sealing member may be inserted between the coolant supply tube and the first coolant pipe and between the coolant discharge tube and the first coolant pipe, respectively.

The module pressing plate may be connected to one pair of second coolant pipes of a facing battery module.

The module pressing plate may have one pair of pipe coupling portions so that the one pair of pipe coupling portions are inserted into the pair of second coolant pipes or the pair of second coolant pipes are inserted into the one pair of pipe coupling portions.

A sealing member may be inserted between the pair of pipe coupling portions and the pair of second coolant pipes.

The pair of first coolant pipes of a facing battery module may be connected to the pair of second coolant pipes of a facing battery module.

The pair of first coolant pipes of a facing battery module may be inserted into the pair of second coolant pipes of the facing battery module, or the pair of second coolant pipes of the facing battery module may be inserted into the pair of first coolant pipes of the facing battery module.

A sealing member may be inserted between the pair of pipe coupling portions and the pair of second coolant pipes.

The coolant may be an insulating oil.

In another aspect of the present disclosure, there is provided a vehicle, comprising the battery pack according to the above embodiments.

Advantageous Effects

According to various embodiments as described above, it is possible to provide a battery pack which may ensure improved cooling performance while enhancing an energy density of battery cells with a reduced manufacture cost, and a vehicle including the battery pack.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
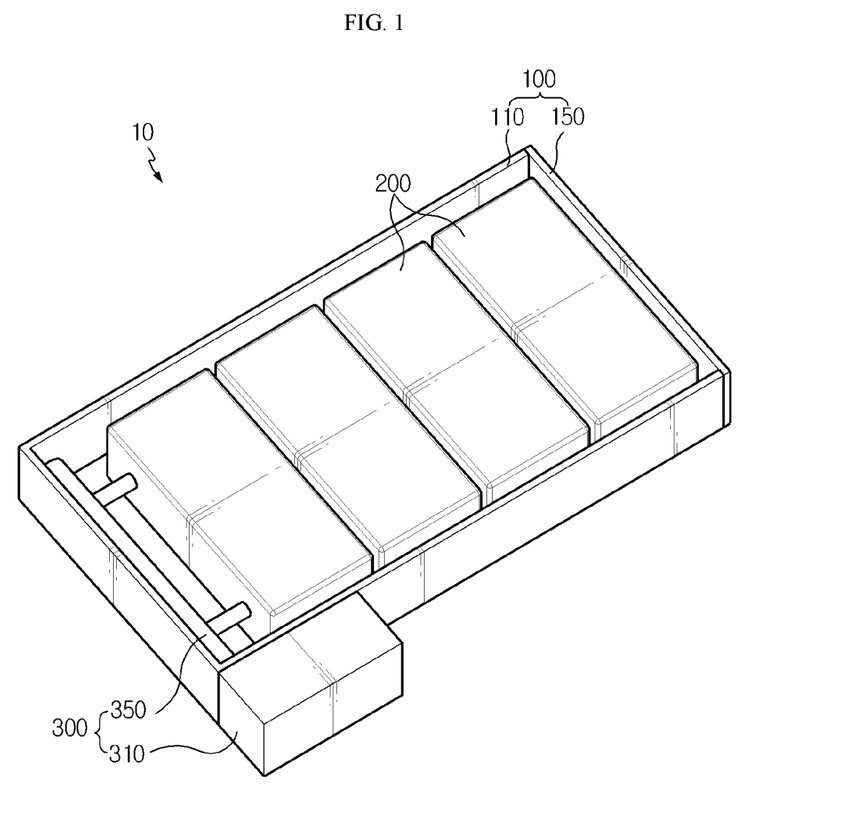
FIG. 1 is a diagram for illustrating a battery pack according to an embodiment of the present disclosure.
Figure 2:
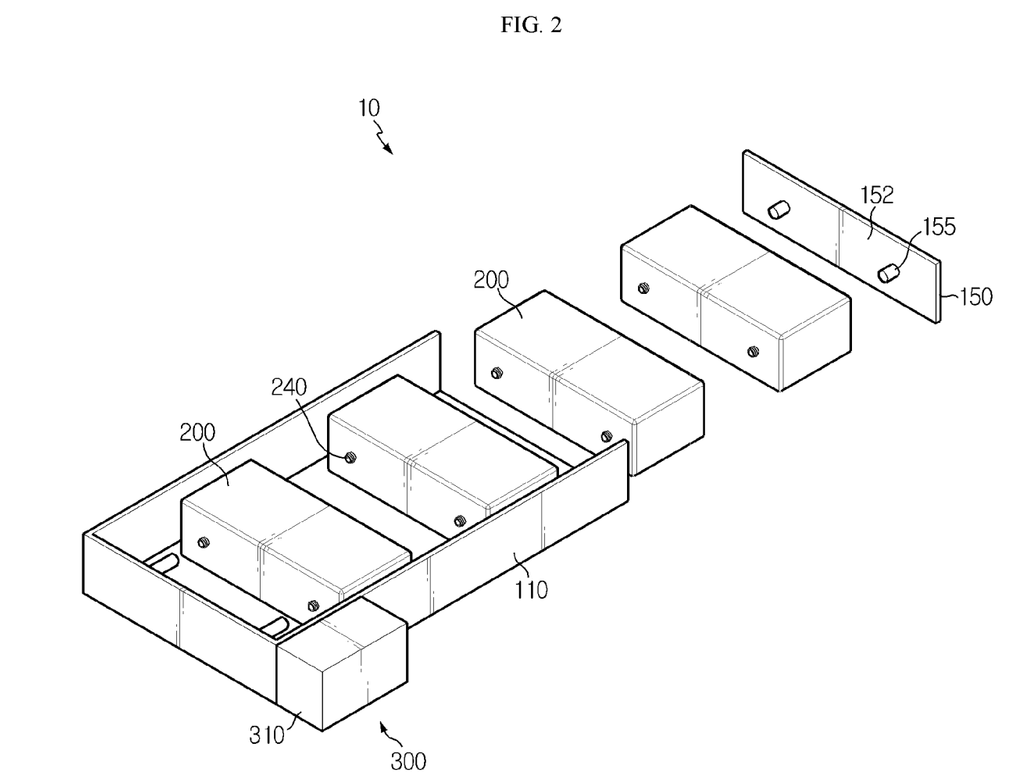
FIGS. 2 and 3 are exploded perspective views showing the battery pack of FIG. 1.
Figure 3:
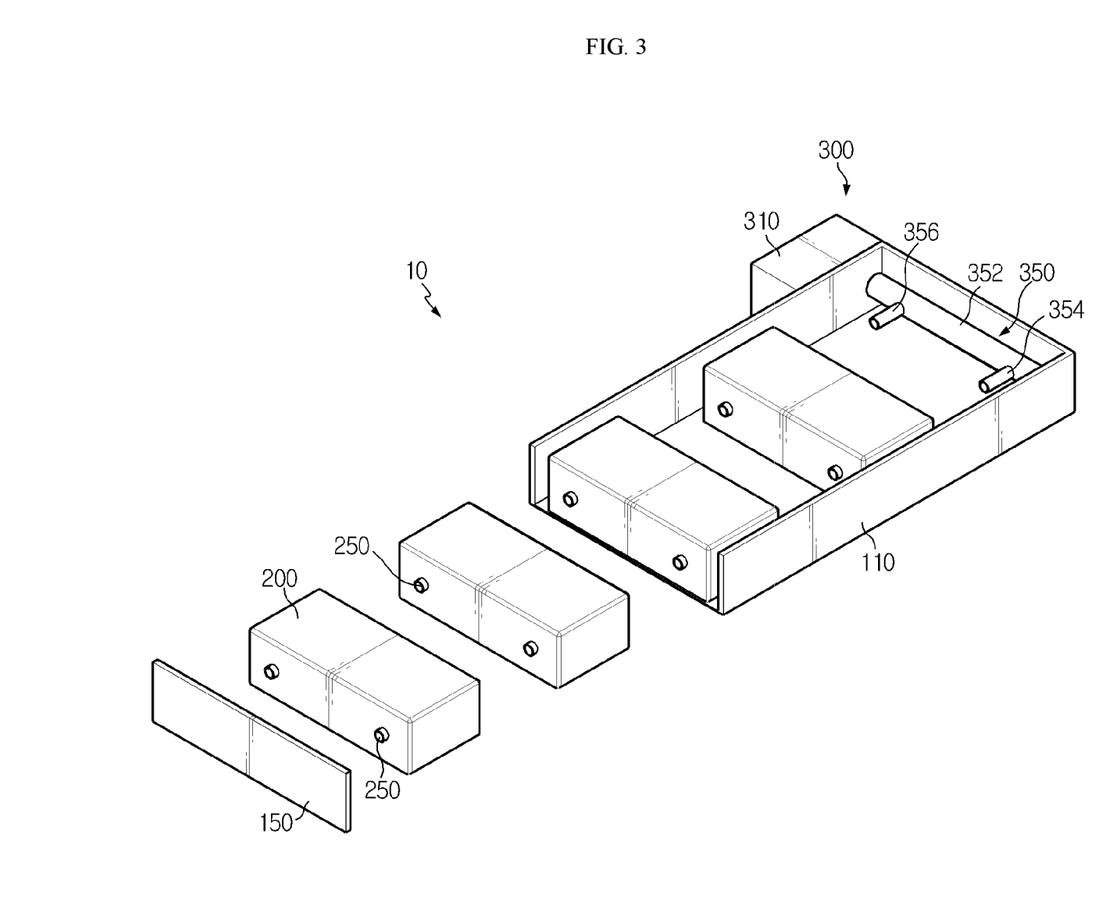
Figure 4:
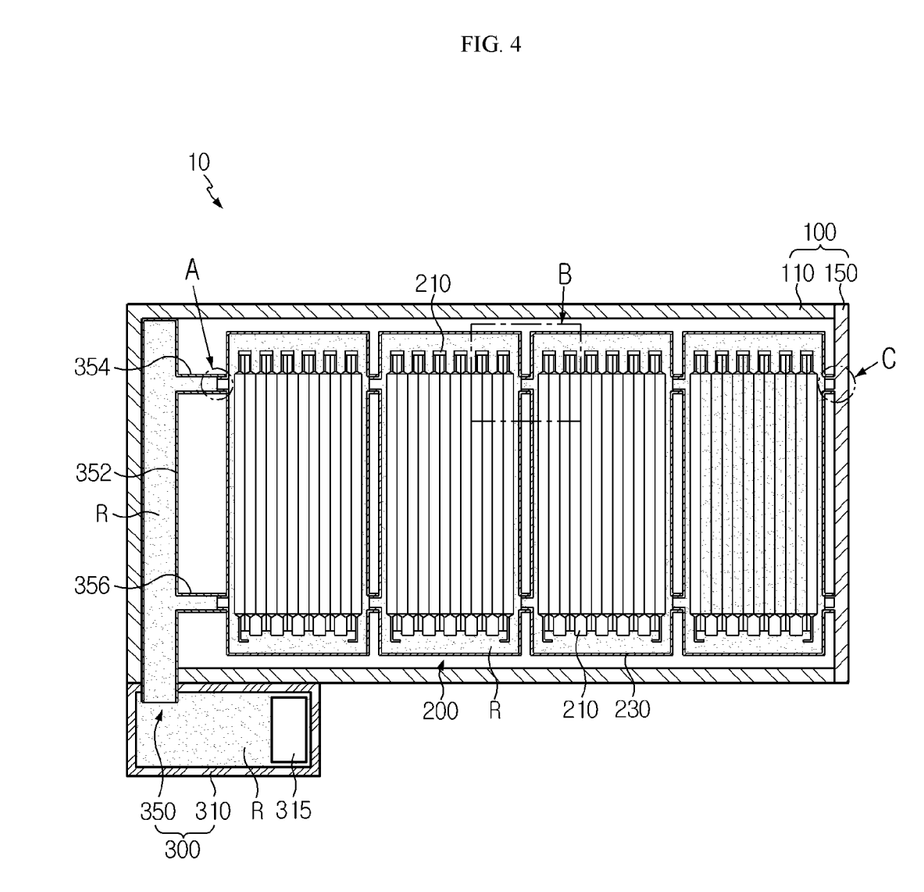
FIG. 4 is a cross-sectioned view showing the battery pack of FIG. 1.
Figure 5:
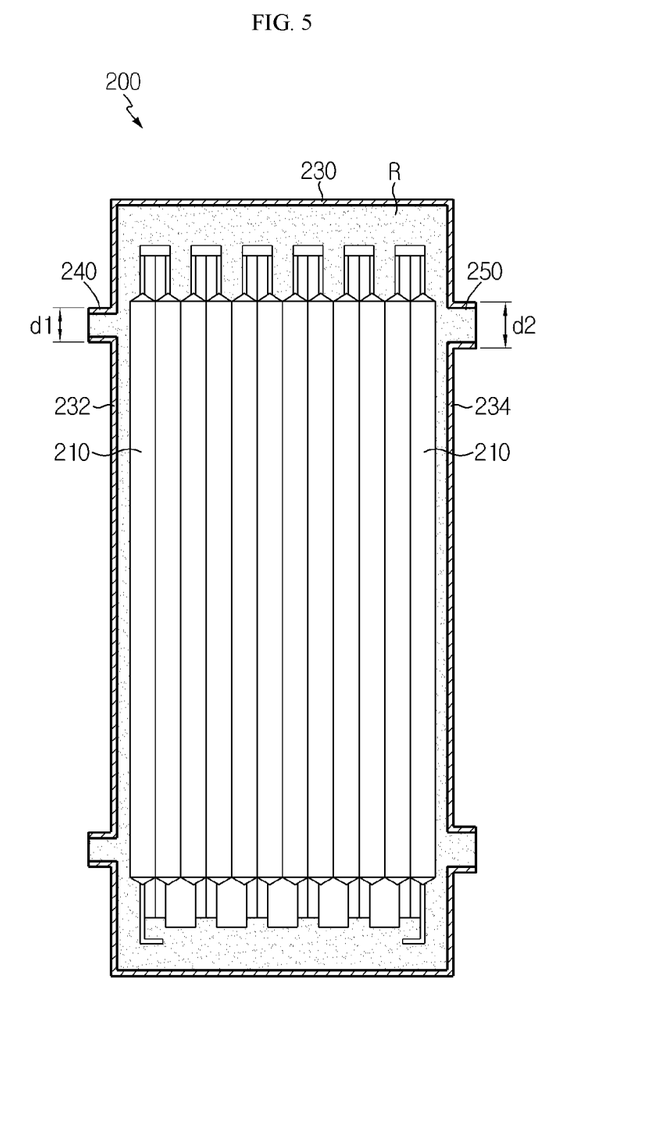
FIG. 5 is a cross-sectioned view showing a battery module of the battery pack of FIG. 4.
Figure 6:
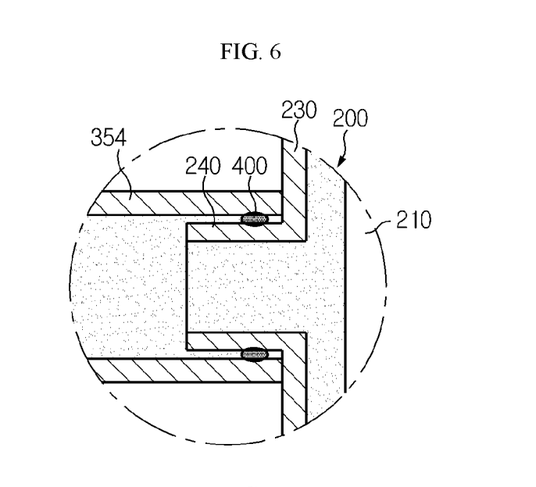
FIG. 6 is an enlarged showing a portion A of FIG. 4.
Figure 7:
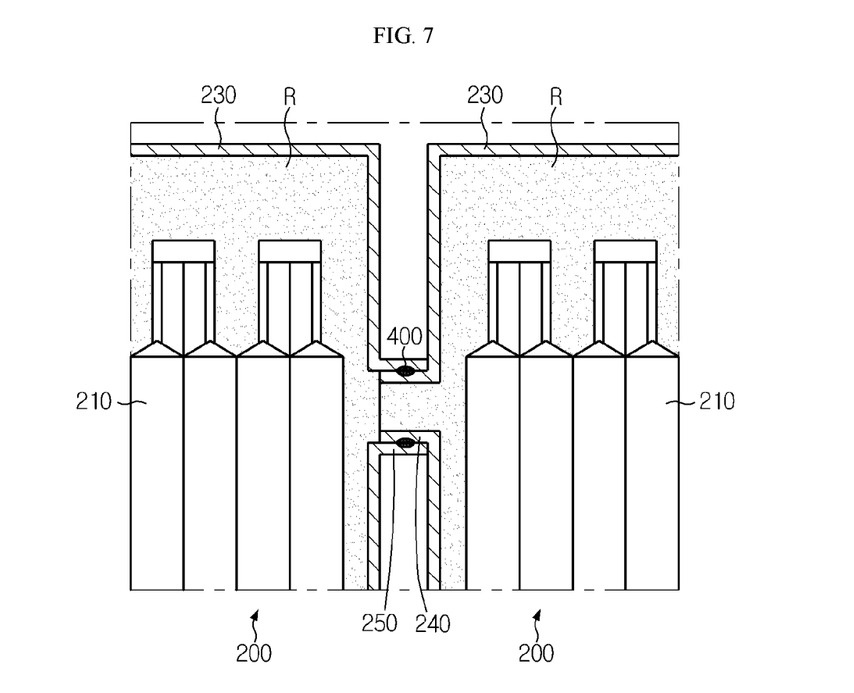
FIG. 7 is an enlarged showing a portion B of FIG. 4.
Figure 8:
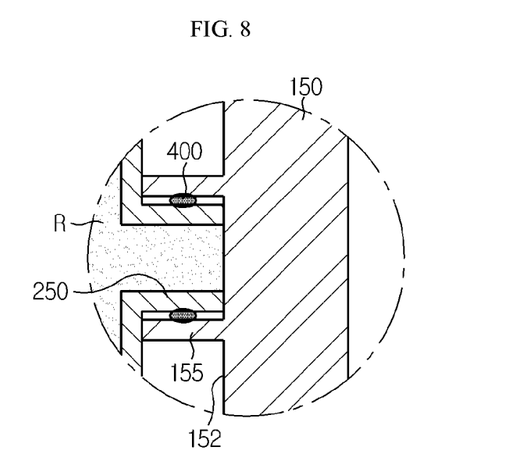
FIG. 8 is an enlarged showing a portion C of FIG. 4.

FIG. 1 is a diagram for illustrating a battery pack according to an embodiment of the present disclosure, FIGS. 2 and 3 are exploded perspective views showing the battery pack of FIG. 1, FIG. 4 is a cross-sectioned view showing the battery pack of FIG. 1, FIG. 5 is a cross-sectioned view showing a battery module of the battery pack of FIG. 4, FIG. 6 is an enlarged showing a portion A of FIG. 4, FIG. 7 is an enlarged showing a portion B of FIG. 4, and FIG. 8 is an enlarged showing a portion C of FIG. 4.

Referring to FIGS. 1 to 8, a battery pack 10 may be provided to a vehicle as a fuel source of the vehicle. As an example, the battery pack 10 may be provided to an electric vehicle, a hybrid vehicle, and various other-type vehicles capable of using the battery pack 10 as a fuel source. In addition, the battery pack 10 may be provided in other devices, instruments or facilities such as an energy storage system using a secondary battery, in addition to the vehicle.

The battery pack 10 may include a pack case 100, a battery module 200, a coolant circulating unit 300, and a sealing member 400.

The pack case 100 forms an appearance of the battery pack 10 and may be mounted to devices, instruments or facilities such as a vehicle. The pack case 100 may include a case body 110 and a module pressing plate 150.

The case body 110 may accommodate at least one battery module 200, more specifically a plurality of battery modules 200, explained later, and at least a portion of the coolant circulating unit 300, more specifically, a circulation pipe 350 of the coolant circulating unit 300.

The module pressing plate 150 may be mounted at one end of the case body 110. The module pressing plate 150 may be disposed to face at least a portion of the coolant circulating unit 300, more specifically to face the circulation pipe 350 of the coolant circulating unit 300, so that at least one battery module 200, more specifically a plurality of battery modules 200, explained later, are interposed therebetween, to press the at least one battery module 200, more specifically the plurality of battery modules 200.

The module pressing plate 150 may be connected to a facing battery module 200, which is a battery module facing the module pressing plate 150 and press the plurality of battery modules 200 toward the circulation pipe 350, explained later.

For this, the module pressing plate 150 may be connected to one pair of second coolant pipes 250 of the facing battery module 200, explained later. The module pressing plate 150 may include a pipe coupling portion 155 for the connection with the pair of second coolant pipes 250.

The pipe coupling portion 155 is provided at an inner surface 152 of the module pressing plate 150 and may be provided in a pair corresponding to the pair of second coolant pipes 250.

The pair of pipe coupling portions 155 may be inserted into one pair of second coolant pipes 250 of the facing battery module 200, or one pair of second coolant pipes 250 of the facing battery module 200 may be inserted into the pair of pipe coupling portions 155. When one pair of second coolant pipes 250 of the facing battery module 200 is inserted into the pair of pipe coupling portions 155, the pair of pipe coupling portions 155 may have a larger diameter than the pair of second coolant pipes 250. When the pair of pipe coupling portions 155 is inserted into one pair of second coolant pipes 250 of the facing battery module 200, the pair of pipe coupling portions 155 may have a smaller diameter than the pair of second coolant pipes 250. Hereinafter, this embodiment will be described based on the case where the pair of pipe coupling portions 155 has a larger diameter than the pair of second coolant pipes 250 so that the pair of second coolant pipes 250 is inserted into the pair of pipe coupling portions 155.

The battery module 200 may be provided in the pack case 100 and include at least one battery cell 210 therein. Hereinafter, this embodiment will be described based on the case where a plurality of battery cells 210 are included in the battery module 200.

The battery module 200 may be provided in plural, and the plurality of battery modules 200 may be electrically connected to each other. The plurality of battery modules 200 may be sequentially disposed between the circulation pipe 350 of the coolant circulating unit 300, explained later, and the module pressing plate 150, and may be connected to each other so that a coolant R, explained later, may circulate therein.

Hereinafter, the plurality of battery modules 200 will be described in more detail.

Each of the plurality of battery modules 200 may include a plurality of battery cells 210, a module case 230, and a plurality of coolant pipes 240, 250.

The plurality of battery cells 210 may be provided using pouch-type secondary batteries and may be electrically connected to each other. Each battery cell 210 may include an electrode assembly, a battery case for accommodating the electrode assembly, and an electrode lead protruding out of the battery case and electrically connected to the electrode assembly. Here, the electrode lead may include a positive electrode lead and a negative electrode lead, where the positive electrode lead may be connected to a positive electrode plate of the electrode assembly and the negative electrode lead may be connected to a negative electrode plate of the electrode assembly.

The module case 230 may accommodate the at least one battery cell 210, more specifically the plurality of battery cells 210. The module case 230 may be filled with a coolant R supplied from the coolant circulating unit 300, explained later. The coolant R may fill the module case 230 to circulate therein so that the plurality of battery cells 210 are cooled. The coolant R may be provided using an insulating liquid to ensure safety. Hereinafter, this embodiment will be described based on the case where the coolant R is an insulating oil.

The plurality of coolant pipes 240, 250 are provided in the module case 230 and may introduce the coolant R into the module case 230 and discharge the coolant R in the module case 230 to the outside of the module case 230.

The plurality of coolant pipes 240, 250 may include one pair of first coolant pipes 240 and one pair of second coolant pipes 250.

The pair of first coolant pipes 240 are provided at one side of the module case 230, specifically at one side surface 232 of the module case 230, and may be spaced from each other by a predetermined distance.

The pair of first coolant pipes 240 may be connected to the pair of second coolant pipes 250 of the facing battery module 200. In addition, the circulation pipe 350, explained later, may be connected to the pair of first coolant pipes 240 of the facing battery module 200.

Here, the pair of first coolant pipes 240 may be inserted into the pair of facing second coolant pipes 250, or the pair of facing second coolant pipes 250 may be inserted into the pair of first coolant pipes 240. If the pair of facing second coolant pipes 250 are inserted into the pair of first coolant pipes 240, a diameter d1 of the pair of first coolant pipes 240 may be greater than a diameter d2 of the pair of facing second coolant pipes 250. If the pair of first coolant pipes 240 are inserted into the pair of facing second coolant pipes 250, the diameter d1 of the pair of first coolant pipes 240 may be smaller than the diameter d2 of the pair of facing second coolant pipes 250. Hereinafter, this present embodiment will be described based on the case where the diameter d1 of the pair of first coolant pipes 240 is smaller than the diameter d2 of the second coolant pipes 250 so that the pair of first coolant pipes 240 are inserted into the pair of facing second coolant pipes 250.

The pair of second coolant pipes 250 may be provided at the other side of the module case 230, specifically at the other side surface 234 of the module case 230, and may be spaced from each other by a predetermined distance.

The pair of second coolant pipes 250 may be coupled to the pair of facing first coolant pipes 240 or the pair of pipe coupling portions 155 of the module pressing plate 150 as described above. In this configuration, the plurality of battery modules 200 may be connected to each other while pressing each other between the module pressing plate 150 and the circulation pipe 350, explained later.

The coolant circulating unit 300 may be connected to the at least one battery module 200, specifically to the plurality of battery modules 200, so that the coolant R circulates in the at least one battery module 200, specifically in the plurality of battery modules 200, and at least a portion of the coolant circulating unit 300 may press the at least one battery module 200, specifically the plurality of battery modules 200, within the pack case 100.

The coolant circulating unit 300 may include a circulating unit body 310 and a circulation pipe 350.

The circulating unit body 310 used for circulating the coolant R in the plurality of battery modules 200 may store the coolant R and be mounted at one side of the pack case 100, specifically at one side of the case body 110.

The circulating unit body 310 may include a circulation pump 315.

The circulation pump 315 is used for circulating the coolant R and may be provided in the circulating unit body 310. The circulation pump 315 may use pumps of various structures which are capable of circulating the coolant R.

The circulation pipe 350 may connect the circulating unit body 310 and the at least one battery module 200 to circulate the coolant R into the at least one battery module 200, specifically into the plurality of battery modules 200.

The circulation pipe 350 may be disposed in the case body 110 through the case body 110 and may be connected to the facing battery module 200 inside the case body 110. Here, the circulation pipe 350 may be connected to one pair of first coolant pipes 240 of the facing battery module 200 for the connection with the at least one battery module 200.

The circulation pipe 350 may be disposed in the case body 110 to press the at least one battery module 200, specifically the plurality of battery modules 200. In detail, the circulation pipe 350 may press the plurality of battery modules 200 toward the module pressing plate 150. Accordingly, the plurality of battery modules 200 may be provided in the case body 110 to be pressed in both directions by the module pressing plate 150 and the circulation pipe 350.

The circulation pipe 350 may include a connection tube 352, a coolant supply tube 354, and a coolant discharge tube 356.

The connection tube 352 is connected to the circulating unit body 310 through the case body 110 and may be disposed in the case body 110 at a side opposite to the module pressing plate 150. Here, the connection tube 352 may be disposed parallel to the module pressing plate 150. In this arrangement, when the plurality of battery modules 200 are pressed in both directions by means of the module pressing plate 150 and the circulation pipe 350, the plurality of battery modules 200 may be disposed in the case body 110 without any distortion such as twisting.

The coolant supply tube 354 may guide the coolant R supplied from the circulating unit body 310 to the at least one battery module 200, specifically from the plurality of battery modules 200. The coolant supply tube 354 may protrude from the connection tube 352 towards the facing battery module 200 and be connected to any one of the pair of first coolant pipes 240 of the facing battery module 200.

Here, the coolant supply tube 354 may be inserted into any one first coolant pipe 240, or any one first coolant pipe 240 may be inserted into the coolant supply tube 354. When any one first coolant pipe 240 is inserted into the coolant supply tube 354, the coolant supply tube 354 may have a larger diameter than any one first coolant pipe 240, and when the coolant supply tube 354 is inserted into any one first coolant pipe 240, the coolant supply tube 354 may have a smaller diameter than any one first coolant pipe 240. Hereinafter, this embodiment will be described based on the case where the coolant supply tube 354 has a larger diameter than any one first coolant pipe 240 so that any one first coolant pipe 240 is inserted into the coolant supply tube 354.

The coolant discharge tube 356 may guide the coolant R circulated from the at least one battery module 200, specifically from the plurality of battery modules 200, to the circulating unit body 310. The coolant discharge tube 356 may protrude from the connection tube 352 toward the facing battery module 200 and be connected to the other one of the pair of first coolant pipes 240 of the facing battery module 200.

Here, the coolant discharge tube 356 may be inserted into the other first coolant pipe 240, or the other first coolant pipe 240 may be inserted into the coolant discharge tube 356. When the other first coolant pipe 240 is inserted into the coolant discharge tube 356, the coolant discharge tube 356 may have a larger diameter than the other first coolant pipe 240, and when the coolant discharge tube 356 is inserted into the other first coolant pipe 240, the coolant discharge tube 356 may have a smaller diameter than the other first coolant pipe 240. Hereinafter, this embodiment will be described based on the case where the coolant discharge tube 356 has a larger diameter than the other first coolant pipe 240 so that the other first coolant pipe 240 is inserted into the coolant discharge tube 356.

The sealing member 400 is used for preventing the coolant R from leaking out and also securing the coupling force among the pair of pipe coupling portions 155 of the module pressing plate 150, the pair of first coolant pipes 240 of the battery module 200, the pair of second coolant pipes 250 of the battery module 200, the coolant supply tube 354 of the circulation pipe 350, and the coolant discharge tube 356 of the circulation pipe 350. The sealing member 400 may be provided in plural.

The plurality of sealing members 400 may be interposed between the pair of pipe coupling portions 155 of the module pressing plate 150 and the pair of second cooling pipes 250 of the battery module 200, between the pair of first coolant pipes 240 and the pair of second coolant pipes 250 of the facing battery module 200, between the coolant supply tube 354 of the circulation pipe 350 and any one first coolant pipe 240 of the facing battery module 200, and between the coolant discharge tube 356 of the circulation pipe 350 and the other first coolant pipe 240 of the facing battery module 200, respectively.

The plurality of sealing members 400 may be provided using, for example, O-rings made of rubber. However, the plurality of sealing members 400 may also be provided using members of other materials and shapes which are capable of preventing the leakage of the coolant R and securing the coupling force, without being limited thereto.

Hereinafter, the operations of the battery pack 10 according to this embodiment configured as above will be described in detail.

Figure 9:
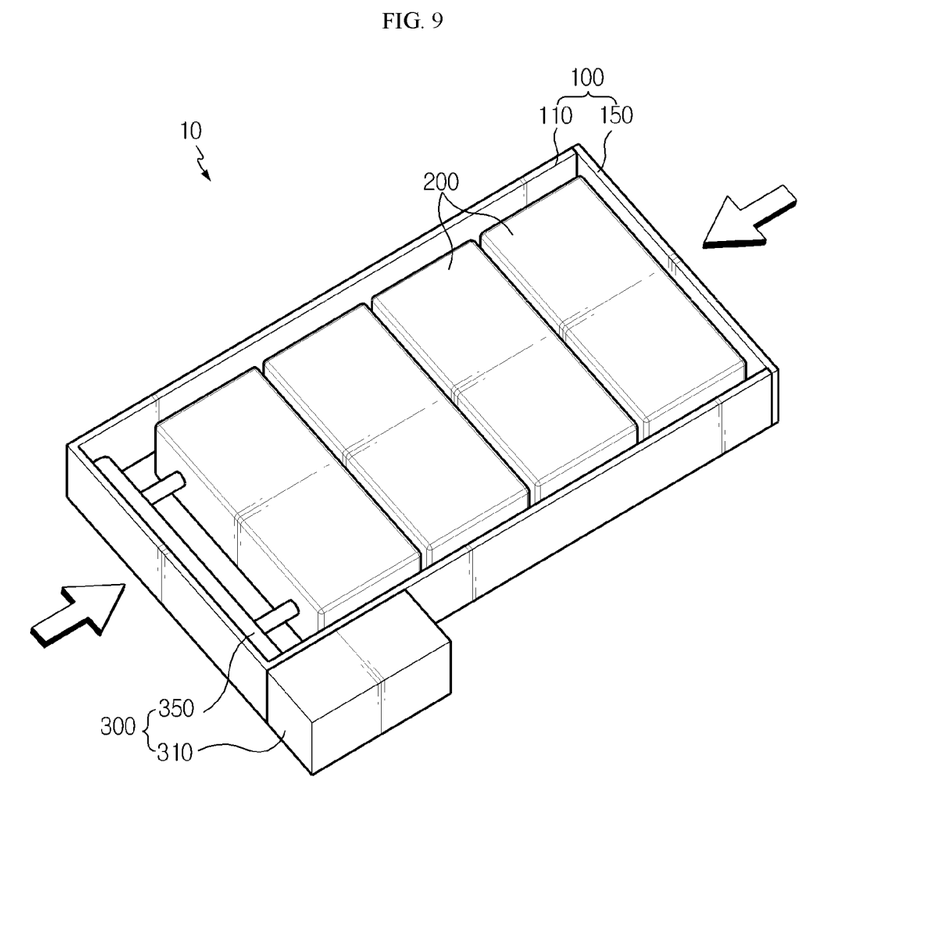
FIGS. 9 and 10 are diagrams for illustrating an operation of the battery pack of FIG. 1.
Figure 10:
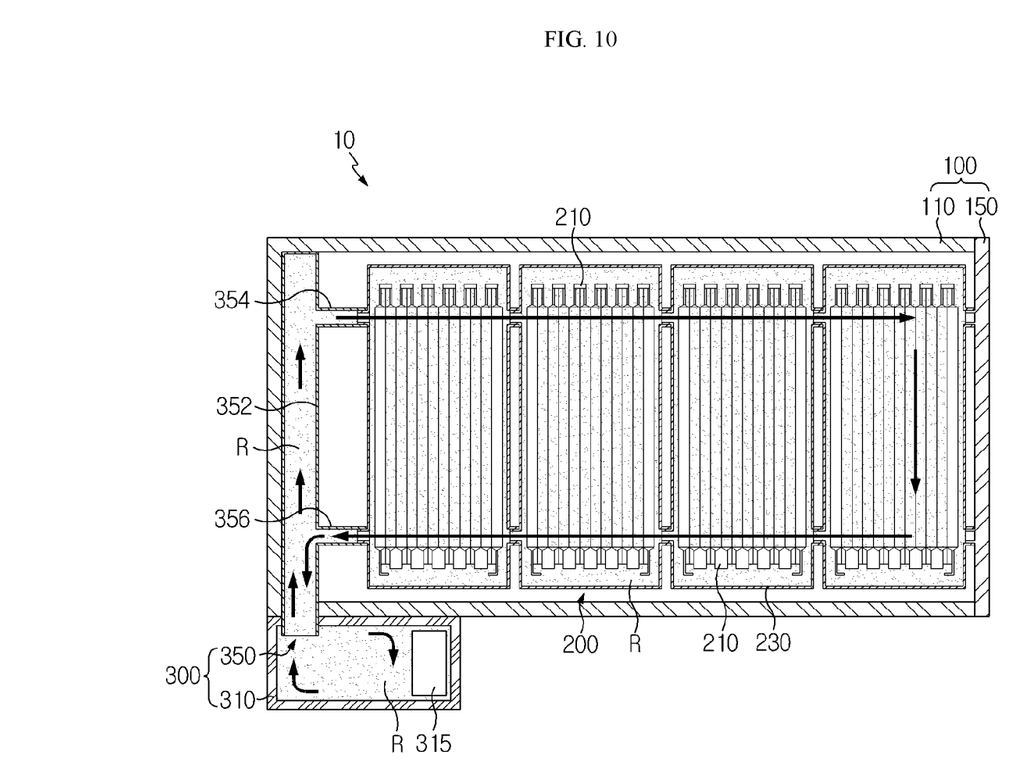

FIGS. 9 and 10 are diagrams for illustrating an operation of the battery pack of FIG. 1.

Referring to FIGS. 9 and 10, first, the battery pack 10 may press surfaces of the battery cells 210 in both directions by means of the module pressing plate 150 and the circulation pipe 350.

Accordingly, in this embodiment, when the plurality of battery modules 200 are mounted in the case body 110, additional components such as a tension bar for stably fixing the plurality of battery modules 200 are not required, thereby reducing the manufacture cost of the battery pack 10.

Also, in this embodiment, the reliability of the connection structure among the plurality of battery modules 200 for circulating the coolant R through the pressing structure may be improved.

Moreover, in this embodiment, it is possible to effectively prevent deformation or breakage of the plurality of battery modules 200 when swelling is generated at the cells later, by means of the pressing structure.

In addition, the battery pack 10 may circulate the coolant R in the plurality of battery modules 200 by means of the coolant circulating unit 300. In this embodiment, the cooling efficiency of the plurality of battery modules 200 may be greatly improved due to the circulating coolant R.

Moreover, in this embodiment, components such as a plurality of cooling pins, a cooling plate and a heat sink, which are conventionally provided for cooling, may be excluded due to the circulating structure of the coolant R, which may reduce the manufacture cost for these components and enhance the volume density of the battery cells 210 as much as the components, thereby increasing the energy density of the battery cells 210.

As described above, in this embodiment, it is possible to provide the battery pack 10 capable of increasing the energy density of the battery cells 210 and improving the cooling performance while reducing the manufacturing cost. Moreover, devices, instruments or facilities such as a vehicle, which have the battery pack 10 according to this embodiment, may also have all the advantages of the battery pack 10 described above.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A battery pack, comprising:
    a pack case forming an appearance of the battery pack;
    at least one battery module provided in the pack case, the at least one battery module comprising a module case having a plurality of walls forming an enclosure;
    a plurality of coolant pipes formed in the walls of the module case configured to introduce coolant into the enclosure of the module case and discharge the coolant in the module case to the outside of the module case;
    at least one battery cell in the enclosure of the module case; and
    a coolant circulator connected to the at least one battery module configured to circulate the coolant into the enclosure of the at least one battery module, at least a portion of the coolant circulator pressing the at least one battery module in the pack case;
    wherein the plurality of coolant pipes are in fluid communication with the interior of the enclosure of the module case and the at least one battery cell.

2. The battery pack according to claim 1, wherein the pack case includes:
    a case body configured to accommodate the at least one battery module and the at least a portion of the coolant circulator; and
    a module pressing plate mounted to the case body and disposed opposite to the at least a portion of the coolant circulator with the at least one battery module being interposed therebetween to press the at least one battery module.

3. The battery pack according to claim 2, wherein the coolant circulator includes:
    a circulator body configured to store the coolant and having a circulation pump for circulating the coolant; and
    a circulation pipe configured to connect the circulator body and the at least one battery module to circulate the coolant into the at least one battery module, the circulation pipe being disposed in the case body to press the at least one battery module.

4. The battery pack according to claim 3, wherein the at least one battery module is a plurality of battery modules including a first battery module and a last battery module, and
    wherein the plurality of battery modules are disposed sequentially between the circulation pipe and the module pressing plate and connected to each other so that the coolant circulates therein.

5. The battery pack according to claim 4, wherein the circulation pipe is connected to the first battery module and presses the plurality of battery modules toward the module pressing plate, and
    wherein the module pressing plate is connected to the last battery module and presses the plurality of battery modules toward the circulation pipe.

6. The battery pack according to claim 4, wherein the plurality of coolant pipes of each module case include:
    one pair of first coolant pipes provided in a first wall of the module case and disposed to be spaced from each other by a first distance; and
    one pair of second coolant pipes provided in a second wall of the module case and disposed to be spaced from each other by a second distance.

7. The battery pack according to claim 6, wherein the circulation pipe is connected to one pair of first coolant pipes of a facing battery module.

8. The battery pack according to claim 7, wherein the circulation pipe includes:
    a connection tube connected to the circulator body and disposed in the case body;
    a coolant supply tube configured to protrude from the connection tube and connected to any one of the pair of first coolant pipes; and
    a coolant discharge tube configured to protrude from the connection tube and connected to the other one of the pair of first coolant pipes.

9. The battery pack according to claim 8, wherein the connection tube is disposed parallel to the module pressing plate.

10. The battery pack according to claim 8, wherein the coolant supply tube and the coolant discharge tube are inserted into the pair of first coolant pipes, or the pair of first coolant pipes are inserted into the coolant supply tube and the coolant discharge tube.

11. The battery pack according to claim 10, wherein a sealing member is inserted between the coolant supply tube and the pair of first coolant pipes and between the coolant discharge tube and the pair of first coolant pipes, respectively.

12. The battery pack according to claim 6, wherein the module pressing plate is connected to the pair of second coolant pipes of the last battery module.

13. The battery pack according to claim 6, wherein the pair of first coolant pipes of a facing battery module are connected to the pair of second coolant pipes of an adjacent battery module.

14. The battery pack according to claim 6, wherein a width of the at least one battery cell is greater than the first distance between the pair of first coolant pipes.

15. A vehicle, comprising a battery pack defined in claim 1.

* * * * *